US008970429B2

(12) United States Patent
Pickle et al.

(10) Patent No.: US 8,970,429 B2
(45) Date of Patent: Mar. 3, 2015

(54) SYSTEMS AND METHODS FOR TRACKING TARGETS BY A THROUGH-THE-WALL RADAR USING MULTIPLE HYPOTHESIS TRACKING

(75) Inventors: Catherine Pickle, Playa Del Rey, CA (US); Samuel S. Blackman, Los Angeles, CA (US); Douglas B. Tyler, Torrance, CA (US)

(73) Assignee: Raytheon Company, Waltham, MA (US)

( * ) Notice: Subject to any disclaimer, the term of this patent is extended or adjusted under 35 U.S.C. 154(b) by 278 days.

(21) Appl. No.: 13/523,747

(22) Filed: Jun. 14, 2012

(65) Prior Publication Data

US 2014/0191899 A1    Jul. 10, 2014

(51) Int. Cl.
*G01S 13/66*    (2006.01)
*G01S 13/06*    (2006.01)
(Continued)

(52) U.S. Cl.
CPC ............... *G01S 13/66* (2013.01); *G01S 13/726* (2013.01); *G01S 13/888* (2013.01); *G01S 7/41* (2013.01); *G01S 2013/462* (2013.01)
USPC .................. 342/195; 706/12; 342/22; 342/27; 342/73; 342/74; 342/89; 342/94; 342/95; 342/96; 342/159; 342/175

(58) Field of Classification Search
USPC ........... 342/21, 22, 27, 28, 61, 66, 67, 73–81, 342/118, 146–164, 175, 192–197, 52–56, 342/89–103, 190, 191; 706/12, 15, 16, 706/20–24; 702/85, 101, 102, 127, 187, 702/189; 382/100, 103, 181, 224, 228; 708/100, 200, 422
See application file for complete search history.

(56) References Cited

U.S. PATENT DOCUMENTS

| 5,134,409 | A | * | 7/1992 | De Groot | 342/158 |
| 5,202,691 | A | * | 4/1993 | Hicks | 342/90 |

(Continued)

FOREIGN PATENT DOCUMENTS

| EP | 1533628 | A1 | * | 5/2005 | G01S 13/72 |
| WO | WO2007/039466 | A1 | * | 4/2007 | G01S 13/72 |

OTHER PUBLICATIONS

S.S. Blackman, "Multiple Hypothesis Tracking for Multiple Target Tracking"; IEEE Aerospace and Electronic Systems Magazine; vol. 19, issue 1, Jan. 2004; pp. 5-18; ISSN 0885-8985; INSPEC accession No. 8018135; digital object identifier 10.1109/MAES.2004.1263228.*

(Continued)

*Primary Examiner* — Bernarr Gregory
(74) *Attorney, Agent, or Firm* — Christie, Parker & Hale, LLP

(57) ABSTRACT

Aspects of the present invention relate to a system (10) and a method for tracking one or more targets by a radar using a multiple hypothesis tracking (MHT) algorithm, the method including operating the radar to transmit a radar beam from a first location toward the one or more targets, operating the radar to receive a plurality of return signals at the first location from the one or more targets, and to generate a plurality of observations for a single radar dwell respectively corresponding to the plurality of return signals, and processing the plurality of observations in accordance with the MHT algorithm for at least two passes such that more than one of the plurality of observations are associated with a single track of the one or more targets.

18 Claims, 7 Drawing Sheets

(51) Int. Cl.

| | |
|---|---|
| G01S 7/487 | (2006.01) |
| G06F 15/18 | (2006.01) |
| G01S 13/72 | (2006.01) |
| G01S 13/88 | (2006.01) |
| G01S 7/41 | (2006.01) |
| G01S 13/00 | (2006.01) |
| G01S 13/46 | (2006.01) |

(56) References Cited

U.S. PATENT DOCUMENTS

| | | | | |
|---|---|---|---|---|
| 5,325,098 | A * | 6/1994 | Blair et al. | 342/95 |
| 5,379,044 | A * | 1/1995 | Carlson et al. | 342/90 |
| 5,414,643 | A * | 5/1995 | Blackman et al. | 342/95 |
| 5,469,374 | A * | 11/1995 | Graham et al. | 342/159 |
| 5,506,586 | A * | 4/1996 | Bull | 342/148 |
| 5,765,166 | A * | 6/1998 | Gotfried et al. | 342/190 |
| 5,793,931 | A * | 8/1998 | Hillis | 706/13 |
| 5,798,942 | A * | 8/1998 | Danchick et al. | 342/96 |
| 6,091,361 | A * | 7/2000 | Davis et al. | 342/195 |
| 6,278,401 | B1 * | 8/2001 | Wigren | 342/195 |
| 6,314,204 | B1 * | 11/2001 | Cham et al. | 382/228 |
| 6,353,679 | B1 * | 3/2002 | Cham et al. | 382/228 |
| 7,133,887 | B2 * | 11/2006 | Sirois | 708/422 |
| 8,405,540 | B2 * | 3/2013 | Porikli | 342/90 |
| 8,437,972 | B2 * | 5/2013 | Ploplys et al. | 702/104 |
| 8,515,881 | B2 * | 8/2013 | Schwoegler et al. | 706/12 |
| 8,654,005 | B2 * | 2/2014 | Christopher et al. | 342/95 |
| 2006/0061504 | A1 | 3/2006 | Leach, Jr. et al. | |
| 2009/0312985 | A1 * | 12/2009 | Eliazar | 702/187 |

OTHER PUBLICATIONS

Chang et al., "People Tracking With UWB Radar Using a Multiple-Hypothesis Tracking of Clusters (MHTC) Method", International Journal of Social Robotics, vol. 2, No. 1, Jan. 9, 2010 (pp. 3-18).

Rutten, et al., "Multipath Track Association for Over-the-Horizon Radar Using Lagrangian Relaxation", Proceedings of SPIE, vol. 5428, Aug. 25, 2004 (pp. 452-463).

Written Opinion of the International Searching Authority for International Application No. PCT/US2013/036486, filed Apr. 12, 2013, Written Opinion of the International Searching Authority mailed Jan. 21, 2014 (6 pgs.).

International Search Report for International Application No. PCT/US2013/036486, filed Apr. 12, 2013, International Search Report dated Jan. 14, 2014 and mailed Jan. 21, 2014 (3 pgs.).

Setlur, P. et al. "*Localizations of Targets inside Enclosed Structures with a Single Sensor*". Work supported by US Army Research Lab under contract W911NF-07-D-0001; IEEE, 2011, pp. 911-916.

Subramaniam, M. et al. "*Multipath-Assisted Multitarget Tracking with Reflection Point Uncertainty*". Signal and Data Processing of Small Targets, 2010; Proc. of SPIE vol. 7698, 76981A-1 to 76981A-12.

* cited by examiner

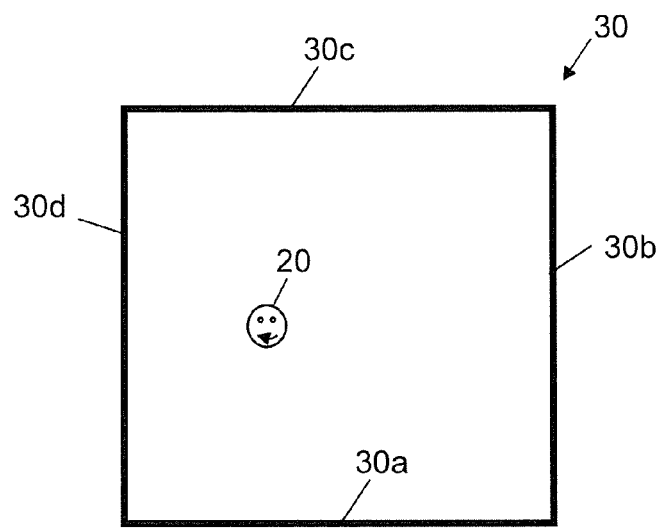
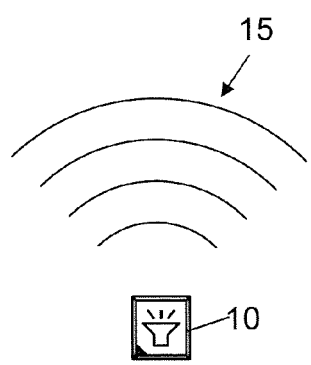
FIG. 1A

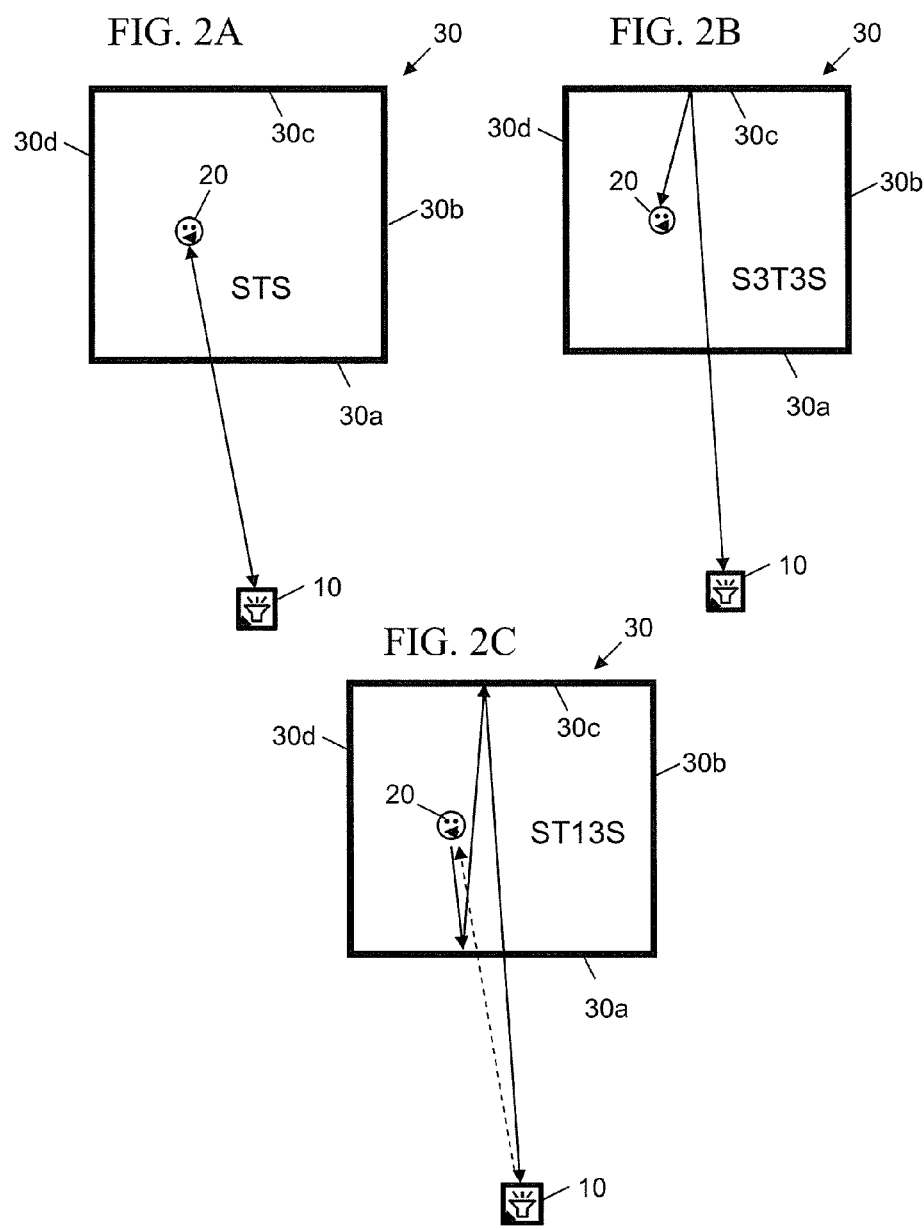

FIG. 4A
FIG. 4B
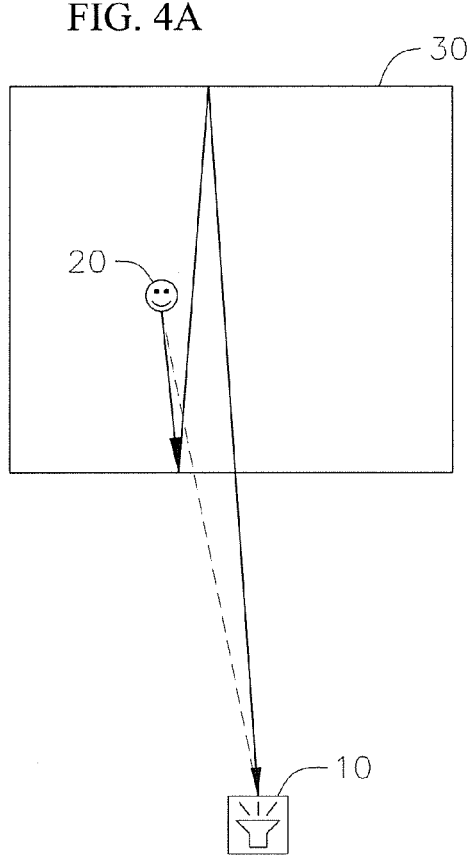
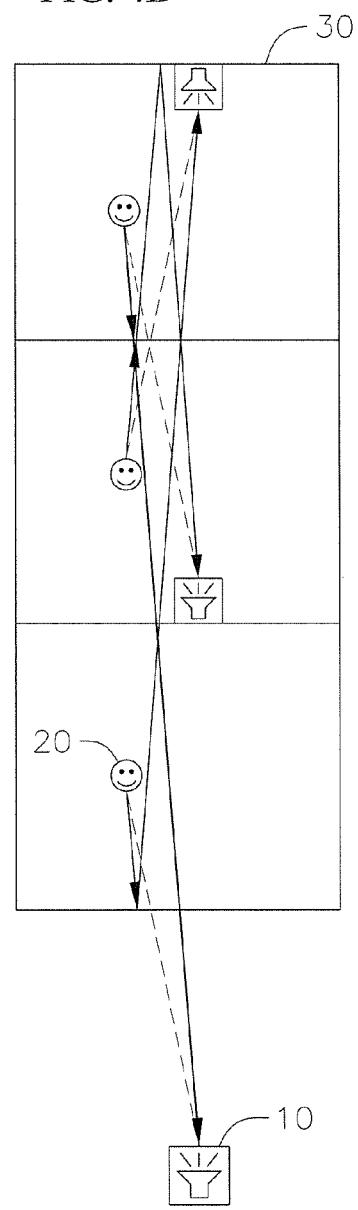

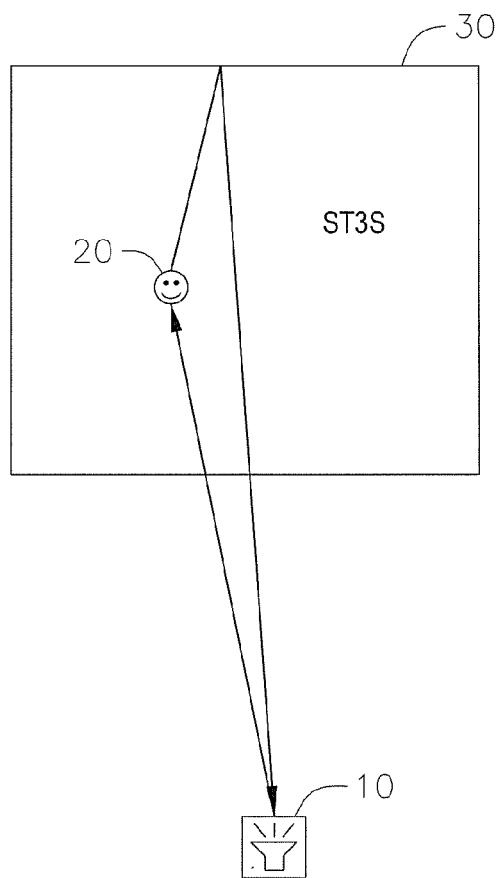

SYSTEMS AND METHODS FOR TRACKING TARGETS BY A THROUGH-THE-WALL RADAR USING MULTIPLE HYPOTHESIS TRACKING

STATEMENT REGARDING FEDERALLY SPONSORED RESEARCH OR DEVELOPMENT

This invention was made with government support under (Contract No. H94003-04-D-0006) awarded by the U.S. Army. The government has certain rights in the invention.

FIELD

Aspects of the present invention relate to radar systems for tracking targets, and, in particular, to a through-the-wall radar system using multiple hypothesis tracking and multipath return signals.

BACKGROUND

During target tracking, a radar system obtains measurements from targets in order to maintain an estimate of their current state, which typically includes kinematic components (e.g., position, velocity, and acceleration, etc.) and other components such as radiated signal strength, spectral characteristic, feature information, coupling coefficients, propagation velocity, etc. Tracks of the targets are estimated and updated by using the radar measurements such as the target's range, angular position, and rate. In a multiple hypothesis tracker, a track is a set of associated detections or observations that represent the estimate of a single target's motion.

When an obstruction (e.g., a wall) is present between the radar system and a target, the radar beam and return signals have to pass through the obstruction in order to track the target. In addition, if the target is surrounded by, for example, multiple walls, the return signals can include multipath return signals because some of the return signals are produced by reflections of the radar beam off the walls before and/or after the radar beam intersects the target. While these multipath return signals can complicate the tracking process, tracking accuracy, probability of detection, and/or reduction of false detection can be improved if the multipath return signals are accounted for and utilized in the tracking process. Therefore, it is desirable to develop radar systems and methods that can utilize multipath return signals to track targets, for example, in through-the-wall radar applications.

SUMMARY

Aspects of the present invention relate to a through-the-wall radar system using multiple hypothesis tracking to account for multipath return signals to improve tracking performance of moving or non-moving targets. In one embodiment, the present invention relates to a method for tracking one or more targets by a radar using a multiple hypothesis tracking onto algorithm, the method including operating the radar to transmit a radar beam from a first location toward the one or more targets, operating the radar to receive a plurality of return signals at the first location from the one or more targets and to generate a plurality of observations for a single radar dwell respectively corresponding to the plurality of return signals, and processing the plurality of observations in accordance with the MHT algorithm for at least two passes such that more than one of the plurality of observations are associated with a single track of the one or more targets.

In another embodiment, the present invention relates to a radar system including a transmitter configured to transmit a radar beam from a first location toward one or more targets, a receiver configured to receive a plurality of return signals at the first location from the one or more targets, and a processor configured to generate a plurality of observations for a single radar dwell respectively corresponding to the plurality of return signals and to process the plurality of observations in accordance with a multiple hypothesis tracking (MHT) algorithm for at least two passes such that more than one of the plurality of observations are associated with a single track of the one or more targets.

BRIEF DESCRIPTION OF THE DRAWINGS

FIG. 1A is a drawing conceptually illustrating a target located inside a building and being tracked by a sensor configured to account for multipath return signals according to an embodiment of the present invention.

FIG. 2A is a drawing illustrating a direct path between the sensor and the target of FIG. 1.

FIGS. 2B and 2C are drawings illustrating two multipaths between the sensor and the target of FIG. 1, respectively.

FIGS. 4A and 4B are drawings illustrating the full roundtrip of FIG. 2C folded and unfolded, respectively, to reveal the half path from a virtual target back to the sensor.

FIG. 5 is a drawing illustrating an asymmetrical multiple path.

DETAILED DESCRIPTION

Embodiments of the present invention are directed to radar systems and methods using a track-oriented Multiple Hypothesis Tracking (MHT) algorithm that has been extended to account for multipath return signals in through-the-wall radar tracking applications. However, the present invention is not limited as such and can be applied in other tracking applications. In the extended MHT algorithm, the hypothesis formation and compatibility logic are adapted to utilize multipath return signals from one or more targets located in an area where the targets are obstructed (e.g., inside a building or a walled area improve tracking performance, probability of detection, and/or reduction of false detection. In addition to the direct returns from the targets, there are generally several multipath returns on each dwell produced by reflections of a radar beam off the building walls before and/or after the beam intersects the targets.

MHT Terms and Concepts

A dwell is the area covered by a radar beam at a given time. Signal processing of dwell data results in observations (detections) that appear to be targets. However, the observations can result from real targets or false alarms. A track is a set of associated observations that represent the state estimate of a single target's motion. The state estimate includes quantities such as location and velocity of the target. A family is a set of tracks representing one potential target. Any given track can only be in one family. A universal track represents the tracker's best estimate of the true path of a target. Each universal track is associated with a family. A cluster is a set of interacting families. Families interact when tracks from each of them associate with the same observation(s). Any given family can only be in one cluster. A hypothesis is a set of non-interacting tracks, and the set of tracks that are compatible with that hypothesis. All tracks in a family are always incompatible with each other. Therefore, a hypothesis can have at most one track from each family. Each hypothesis has only tracks that use independent observations (i.e., each observation is associated with no more than one track).

Example Embodiments

According to embodiments of the present invention, the observations of a single dwell are processed by an extended MHT algorithm in multiple passes (or loops) in order to allow a track to be updated with both direct return and multipath return observations on the same dwell. During a first pass, all of the observations are assumed be direct path returns, and in later passes (2 or more), the observations are assumed to be predetermined feasible multipath returns. Final track pruning based upon probability is deferred until the last pass after all previous passes for a given dwell are completed. Thus, a track can be updated by more than one observation on a single dwell, but an observation can only be used once in any valid hypothesis.

Figure 1B:
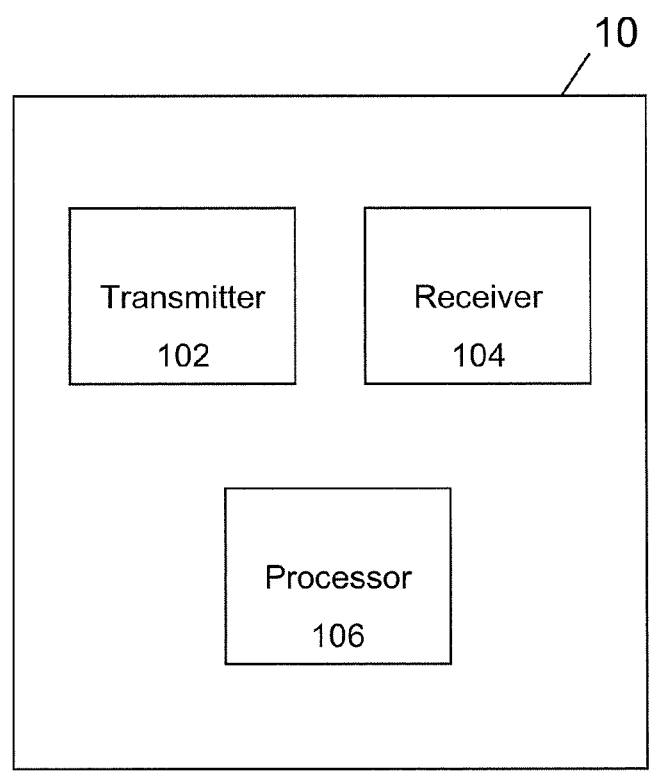
FIG. 1B is a drawing conceptually illustrating the sensor of FIG. 1 including a transmitter, a receiver, and a processor according to an embodiment of the present invention.

FIG. 1A is a drawing conceptually illustrating a target 20 located inside a building 30 and tracked by a sensor 10 (e.g., a radar system such as a Doppler radar) that is configured to account for multipath return signals according to an embodiment of the present invention. FIG. 1B is a drawing conceptually illustrating the sensor 10 including a transmitter 102, a receiver 104, and a processor 106 according to an embodiment of the present invention. The processor 106 (e.g., a microcontroller or a CPU) is configured to control the operations of the transmitter 102 and the receiver 104 such that the transmitter 102 can be used to emit a radar beam toward a target, and the receiver 104 can be used to receive return signals from the target.

Referring back to FIG. 1A, the sensor 10 emits a beam 15 (e.g., a radar beam) toward the target 20 through a first wall 30a of the building 30. In some embodiments, it is assumed that the shape and building layout of the building 30 including the first wall 30a, a second wall 30b, a third wall 30c, and a fourth wall 30d are generally known as well as the relative height between the sensor 10 and the floor of the building 30. In this case, the radar returns from the target 20 generally include a direct path return signal and a number of multipath return signals. The multipath return signals are produced by reflections of the radar beam 15 off the building walls (30a-30d) before and/or after the beam 15 intersects the target 20. The multipath return signals will be at a longer range and may have a different range rate measurement than those of the direct path return signal.

FIG. 2A is a drawing illustrating a direct path STS between the sensor 10 and the target 20. FIGS. 2B and 2C are drawings illustrating two multipaths (S3T3S and ST13S) between the sensor 10 and the target 20, respectively. In FIG. 2A, the direct path STS refers to the direct path in which the radar beam 15 goes from the sensor 10 (S) to the target 20 (T) and is reflected from the target 20 back to the sensor 10. In FIG. 2B, the multipath S3T3S refers to the path in which the radar beam 15 goes from the sensor 10 to the third wall 30c, is reflected from the third wall 30c to the target 20, is reflected from the target 20 back to the third wall 30c, and is reflected from the third wall 30c back to the sensor 10. In FIG. 2C, the multipath ST13S refers to the path in which the radar beam 15 goes from the sensor 10 to the target 20, is reflected from the target 20 to the first wall 30a, is reflected from the first wall 30a to the third wall 30c, and is reflected from the third wall 30c back to the sensor 10. It was observed that the return signal of the multipath ST13S was stronger than that of the multipath S3T3S. The multipath ST13S is not symmetrical and can be represented by a pair of half paths, with ST joined to T13S, which define the roundtrip ST13S (coherently reinforced with its reversal, S31TS).

In each of the cases of FIGS. 2A-2C, the radar beam 15 traverses the first wall 30a twice. Also, the multipath return signals (e.g., S3T3S and ST13S) are accounted for in the track-oriented MHT algorithm according to embodiments of the present invention in order to reduce the number of false tracks that can be formed and also to improve performance for tracks on the true targets. The present invention, however, is not limited to the particular multipaths of FIGS. 2B and 2C. To the contrary, other suitable multipath returns can be considered in various embodiments of the present invention.

In order to utilize the multipath return signals in the track update process, a multipath model has been defined for use by a tracker of the sensor 10. The multipath model is used to predict the expected measurements (e.g., range, range rate, and azimuth angle) from the direct and multipath return signals. First, the direct path (e.g., STS) is defined. Then, a suitable radar model that assumes specular reflections is used to define likely multipaths (e.g., S3T3S and ST13S) as a function of the target 20 and the sensor 10 positions and of the building layout. The result will be a set of likely multipath trajectories that result from various bounce paths and that are a function of the target position. Given the estimated target position, the predicted multipath measurements (e.g., measured range, range rate, and azimuth angle) can be computed for the likely potential multipath returns. The uncertainty on these measurements can be directly defined as a function of the uncertainty in the target state estimate and the measurement error, but may also include uncertainty in the knowledge of the true reflection point.

Referring to FIGS. 2A-2C, the target 20 is inside the building 30, and the sensor 10 is outside of the building 30 with the first wall 30a therebetween. Most of the recovered energy leaving the sensor 10 passes through the first wall 30a, hits the target 20, passes through the first wall 30a again, and returns to the sensor 10 following the direct path STS of FIG. 2A. The positions and velocities of the sensor 10 (S) and the target 20 (T) are denoted in Cartesian coordinates by $S=(x_S, y_S)$, $T=(x_T, y_T)$ and $\dot{T}=(\dot{x}_T, \dot{y}_T)$, with the origin (0, 0) at the building center, the x-axis extending toward the second wall 30b, and the y-axis extending toward the third wall 30c. The range, Doppler and angle of the target 20 can be given by $$r = \text{range} = \frac{1}{2}\text{path} - \text{length} = |T - S| = \sqrt{(x_T - x_S)^2 + (y_T - y_S)^2}, \quad (1a)$$

$$\dot{r} = \text{range} - \text{rate} = \text{Doppler} = \frac{d}{dt}r = \dot{T} \cdot (T - S)/|T - S|, \quad (1b)$$

and $$\text{azimuth} = \theta = \arctan 2(y_T - y_S, x_T - x_S) \quad (1c)$$

Figure 3:
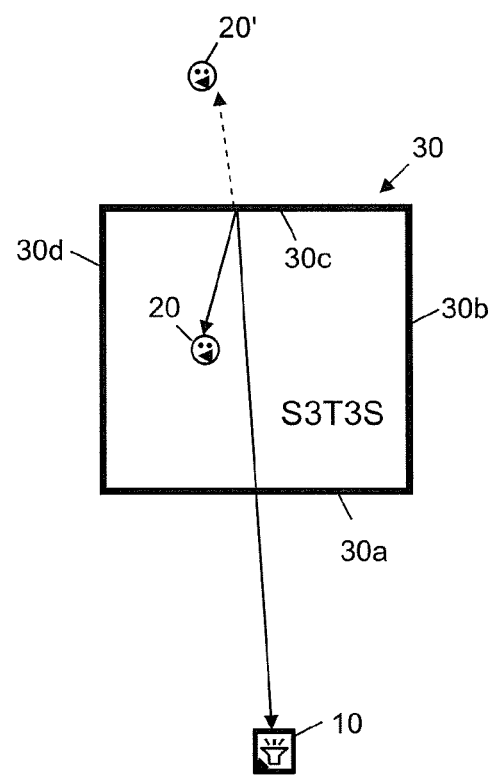
FIG. 3 is a drawing illustrating a mirror image of the target created by a return signal of the multipath of FIG. 2B.

FIG. 3 is a drawing illustrating a mirror image 20 of the target 20 created by the return signal of the multipath S3T3S. The mirror image 20' is located behind the third wall 30c. The resulting mirror image 20' is identical in range, Doppler, and angle measurements to an image one would see of a real second target behind (outside) the building 30, moving symmetrically to the target 20, with respect to the third wall 30c. With the distance between the first wall 30a (front wall) and the third wall 30c (back wall) equal to W, the range, Doppler, and angle of the mirror image 20' are given by $$r' = |T' - S| = \sqrt{(x_T - x_S)^2 + (W - y_T - y_S)^2}, \quad (2a)$$

$$\dot{r}' = \frac{d}{dt}r' = \qquad (2b)$$

$$\dot{T}' \cdot (T' - S)/|T' - S| = (\dot{x}_T, -\dot{y}_T) \cdot \frac{(x_T - x_S, W - y_T - y_S)}{r'},$$

and $$\theta' = \arctan 2(W - y_T - y_S, x_T - x_S). \qquad (2c)$$

The direct path STS of FIG. 2A and the multipath S3T3S of FIG. 2B both have the property that the second half (return halt) of the round trip retraces the first half, in reverse order, so that the first half and the second half are symmetrical. However, roundtrips may not always go from the sensor 10 (S) to the target 20 (T) and then back from T to S using the same path. Thus, a roundtrip between S and T can be broken down into different half paths with, for example, ST joined to TS, and S3T joined to T3S, respectively. However, the present invention is not limited to the examples of FIGS. 2B and 2C. To the contrary, any two suitable half paths can be stitched together to form a feasible multipath round trip according to various embodiments of the present invention. Referring to FIG. 2C, it was observed that the return signal of the multipath ST13S was stronger than that of the multipath S3T3S. The multipath ST 13S is not symmetrical and can be represented by a pair of half paths, with ST joined to T13S, which define the roundtrip ST13S (coherently reinforced with its reversal, S31TS).

FIGS. 4A and 4B are drawings illustrating the full roundtrip ST13S folded and unfolded, respectively, to reveal the half path from the virtual target $T''=(x_T, y_T+2W)$ back to the sensor 10. The range and Doppler of the virtual target T'' are given by $$2r_{ST13S} = |T - S| + |T'' - S| = \qquad (3a)$$
$$\sqrt{(x_T - x_S)^2 + (y_T + 2W - y_S)^2} + \sqrt{(x_T - x_S)^2 + (y_T - y_S)^2}$$

$$2\dot{r}_{SR13S} = \dot{T} \cdot \frac{(T - S)}{|T - S|} + \dot{T} \cdot \frac{(T'' - S)}{|T'' - S|} \quad (\text{since } \dot{T}'' = \dot{T}). \qquad (3b)$$

The observed angle to the multipath ST13S is the average of $$\theta = \arctan 2(y_T - y_S, x_T - x_S) \text{ and } \theta' = \arctan 2(2W + y_T - y_S, x_T - x_S) \qquad (3c)$$

if the terms are close to equivalency.

FIG. 5 is a drawing illustrating another multipath ST3S, which is an asymmetrical path. The range of the multipath ST3S is given by $$2r_{ST3S} = |T-S| + |T'-S| = \sqrt{(x_T-x_S)^2 + (y_T-y_S)^2} + \sqrt{(x_T-x_S)^2 + (W-y_T-y_S)^2} \qquad (4)$$

However, the multipath ST3S may not be used because the Doppler in this case is nearly zero no matter what direction the target 20 moves in, and the sensor 10 generally masks out targets with small Doppler measurements.

In various embodiments, the MHT algorithm identifies potential feasible roundtrips that involve at most some predetermined number of reflections (other than the target itself) and limits its attention to this subset. In one embodiment, the results are limited to a total of four reflections. However, the present invention is not limited thereto. Various embodiments of the present invention can consider more than four reflections in the MHT algorithm.

Figure 6:
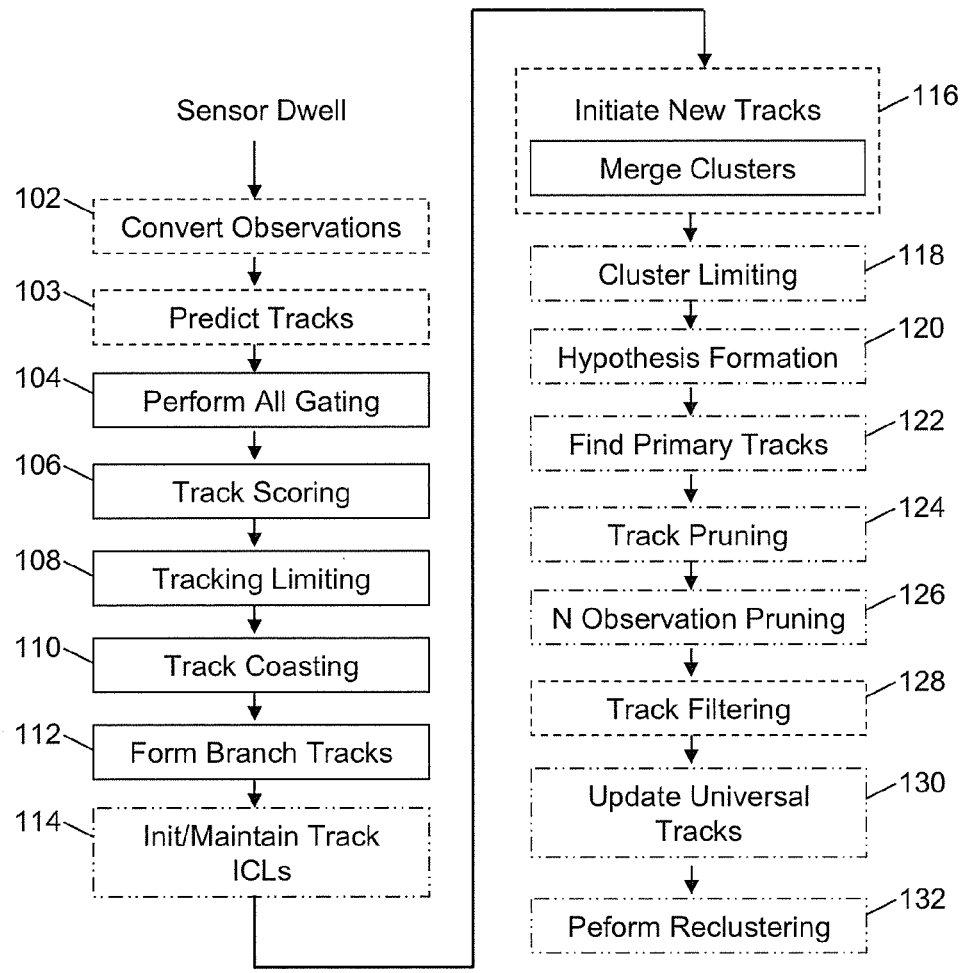
FIG. 6 is a flowchart illustrating a multiple hypothesis tracking (MHT) algorithm for a tracker configured to account for multipath return signals according to an embodiment of the present invention.

FIG. 6 is a flowchart illustrating a MHT algorithm for a tracker of the sensor 10 configured to account for the multipath return signals according to an embodiment of the present invention. Referring to FIG. 6, the MHT algorithm is executed for multiple passes (or loops) including a direct path loop and one or more multipath loops. First, the sensor 10 is operated to collect observations in a single dwell. Then the observations are processed through the multiple passes of the MHT algorithm. Some of the non-limiting features of the modified MHT algorithm are as follows. More than one observation (or detection) from a given dwell may be associated with a track. Each observation can only be used once as either a direct or multipath return, with at most only one of these observations being associated as a direct path. Also, observations that are determined to be from a direct path are handled differently than the multipath observations.

Direct Path Loop

In the first pass, the collected observations are processed as though they were all direct path returns with a constraint that at most one assumed direct path observation can be associated with a given track. Still referring to FIG. 6, during the first pass, Blocks 102, 103, 104, 106, 108, 110, 112, 116, and 128 are performed.

In Block 102 (Convert Observations), for each observation, the radar measurements are converted into the internal coordinate frames used by the tracker. For example, measurements of range, azimuth, and elevation angle are converted to the corresponding Cartesian tracking coordinates.

In block 103 (Predict Tracks), each track that already exists in the tracker is propagated forward to the current time (without using any of the current observations). The propagation allows the tracker to give the best estimate of where the target associated with each track should be at the current time, given the past data collected on the target. For computational efficiency, only tracks that are sufficiently close to the current set of observations are propagated forward. In one embodiment, the tracks are predicted in the Cartesian tracking coordinates to the current time, and Blocks 102 and 103 are only performed during the first pass (direct path loop) of the MET algorithm of FIG. 6.

In Block 104 (Perform all Gating), existing tracks in the tracker are checked against current observations. The purpose is to see which observations are close to existing tracks, because close observations are good candidates for extending tracks. Several gates of increasing strictness are used for each observation-track pair to determine if a particular observation-track pair is a likely candidate. Multiple gates can be used to increase computational efficiency. Quick and coarse gates are generally used first. If these coarse gates are passed, then more computationally burdensome fine gates are used. If an observation-track pair is determined to be a good candidate, the normalized distance of the observation from the track is computed. The distance is normalized by the uncertainty associated with the track. A smaller normalized distance indicates a better match. In addition to considering the case of a direct return signal from the sensor to the target and back to the sensor, in subsequent multipath passes of the MHT algorithm, various likely multipath returns ("bounces" off walls) are also considered.

In block 106 (Track Scoring), the track score for each track is determined by generally known methods. The track score gives a statistically based evaluation of the probability that an observation should be associated with a given track. The score is a log-likelihood ratio based on kinematics and signal characteristics for the hypotheses. The track score is updated each time a new observation is added to the track or when the track does not receive an observation when its position was in the field-of-view of the sensor.

In Block 108 (Track Limiting), in order to maintain computational feasibility, the number of tracks that are maintained by the tracker are suitably limited. Thus, if the number of current tracks exceeds a predetermined maximum number, approximate track probabilities are computed by a suitable generally known method, and relatively low probability tracks are deleted until the number of tracks reaches the acceptable predetermined limit.

In Block 110 (Track Coasting), for tracks that are not associated with any observation on the current dwell, these tracks maintain their predicted positions and receive a suitable miss penalty that is added to their track scores.

In Block 112 (Form Branch Tracks), new branch tracks can be formed here from a parent track based on the current observations. The new track is either updated by associating one of the current observations with the track, or by assuming that no observation came in for the track for the current time. Book keeping is performed for any new branch tracks formed from their corresponding parent tracks that are associated with an observation on the current dwell. Each branch track is assigned a new number, and it inherits information such as the predicted track state estimates from its parent track.

In Block 116 (Initiate New Tracks/Merge Clusters), new tracks can be initiated from the observations because all observations are assumed to be direct path returns (rather than multipath returns) from the target during the first pass. First, each observation from the current time starts a new track. This accounts for the possibility that the observation comes from a new target and does not associate with a track for a previously detected target. Second, clusters are checked to see if the newly formed tracks lead to the necessity to merge clusters. Clusters are merged if tracks from two or more clusters now associate with the same observation(s). Each cluster includes a set of tracks that share observations. Thus, the tracks in a cluster do not share observations with tracks in any other cluster. However, when a new set of observations are associated with new and/or existing tracks, there may be tracks in different clusters that share the new observations. Therefore, the clusters are merged when they share observation(s).

In Block 128 (Track Filtering), the track state estimates are updated with the new observations that have been assigned to the tracks. Because Block 128 is performed during the first pass, only those observations that are assumed to be direct path returns are allowed to update tracks. However, the present invention is not limited thereto. In various embodiments, track filtering may be performed in the subsequent multipath loops. During track filtering, each track is updated by, for example, Kalman filtering in the observations associated with that track for the current dwell. This updates the track state and covariance. The tracks may be processed either using a single filter (SF) or a variable structure interacting multiple model (VS-IMM). Initiated tracks use SF and remain that way until they reach a certain level of track maturity and fidelity. After that, the tracks are converted to VS-IMM. However, the present invention is not limited to the above-described filtering methods. In various embodiments, other suitable filtering methods generally known in the art may be used to update the tracks.

Multipath Loops

According to the above-described first pass of the MHT algorithm, after existing tracks are updated with observations that are assumed to be direct path returns, and after new tracks are initiated under the assumption that these direct path returns represent newly detected targets, the observations are processed again as potential multipath returns in one or more multipath pass of the MHT algorithm to be described below in more detail. Each feasible multipath return case (e.g., FIGS. 2B and 2C) is processed in a separate pass or loop of the MHT algorithm, in which the observations are processed as potential multipath returns for that particular case. This allows a track to be updated by a number of assumed multipath observations, and a new state estimate of a track can be computed before the track is tested for update with observations under a different assumed multipath case.

Referring to FIG. 6, in each of the multipath loops, except the final loop, Blocks 104, 106, 108, 110, 112, and 116 are performed. Blocks 104, 106, 108, 110, 112, and 116 have been described above, and therefore redundant description of these blocks will not be repeated herein. However, the operation of the Block 116 in the multipath loops is different from that of the direct path loop. In the multipath loops, no new track will be formed in the Block 116. However, the clusters of tracks are still checked to determine whether or not they should be merged in Block 116. The clusters will be merged if tracks from two or more clusters now associate with the same observation(s).

Final Loop

Still referring to FIG. 6, in the final loop of the MHT algorithm, in addition to the above-described blocks of the multipath loops, Block 114, Block 118, Block 120, Block 122, Block 124, Block 126, Block 130, and Block 132 are performed during the final loop, after the direct path loop and other multipath loops have been performed. Each block of the final loop will be described in more detail below. However, redundant description of the blocks already described above will not repeated herein.

In Block 114 (Init/Maintain Track Incompatibility Lists), lists of the tracks that are incompatible with each other are maintained and updated. The lists may have changed because more tracks are interacting with each other if they are gated with the same observations. Tracks that share observations are considered to be incompatible and cannot be contained in the same hypothesis or in the output to the user. Thus, each track is incompatible with a list of other tracks. Block 114 updates those lists and initiates new lists for new tracks.

In Block 118 (Cluster Limiting), in order to maintain computational feasibility for hypothesis formation, the number of tracks in a cluster are limited to a predetermined number. When this predetermined number is exceeded, approximate probabilities are computed by a suitable method, and relatively low probability tracks are deleted from the cluster. Therefore, the number of tracks in a cluster is reduced if it becomes too high for a particular implementation of the MHT algorithm.

In Block 120 (Hypothesis Formation), multiple track hypotheses are formed from compatible tracks to represent the targets in the scene (e.g., building 30). A suitable search routine is implemented in order to find the hypotheses with the highest scores where the hypothesis score is the sum of the track scores contained in the hypothesis. In general, not all hypotheses can be found because of computational bottlenecks. Suitable non-exhaustive search techniques can be used to find likely hypotheses. A higher score indicates a more consistent or better fidelity hypothesis. Track probabilities are calculated by calculating and summing the probability of each hypothesis that the track appears in. If a track appears in multiple high scoring hypotheses, this indicates that the track is relatively more likely to be representative of the true target motion.

In Block 122 (Find Primary Tracks), non-conflicting tracks that represent the best estimate of the tracker at the current time are chosen. Tracks that are in the most likely hypothesis and that satisfy score and number of observations criteria are identified for inclusion in a Universal Track File that contains the primary tracks that are output to the user.

In Block 124 (Track Pruning), tracks are deleted according to suitable deletion criteria. The deletion criteria eliminate tracks that have little supporting data or are not as likely as other tracks that explain the same set of observations. Here, track probabilities are computed after hypothesis formation, and those tracks whose probabilities fall below a deletion threshold are deleted.

In Block 126 (N Observation Pruning), additional deletion criteria are used to eliminate tracks that are relatively unlikely to reflect true target motion. Here, final irrevocable data association decisions are made for N (e.g., N=5 or more) observations in the past. The value of N is generally independent from the number of observations on a given dwell. This effectively provides a sliding window over which alternative hypotheses are evaluated with the final hypothesis choice being made at the back end of the window.

In Block 130 (Update Universal Tracks), existing universal tracks are updated with the primary tracks, and new universal tracks are formed from the primary tracks that have just satisfied the output criteria for the first time on the current dwell. The universal tracks are the tracks that are reported to, for example, a user display or other suitable output devices.

In Block 132 (Performing Reclustering), the clusters are checked to see if they can be separated into smaller clusters. During the previous passes, some tracks may have been deleted from certain clusters. If tracks were deleted, the cluster in which the track was deleted from may be able to be separated into smaller clusters. Smaller clusters are desirable because it improves processing time during the hypothesis formation (which occurs later in the chain).

Filtering, Prediction and Scoring

In various embodiments of the present inventions, filtering and prediction are performed in the standard manner using Interacting Multiple Model (IMM) filtering with two models—one for non-maneuvering targets and the other for maneuvering targets. Tracking states are position and velocity in the horizontal (x, y) plane. Tracks are initiated in Cartesian (TCF) coordinates and then predicted to the next dwell in TCF coordinates so that association can occur. Tracks are then converted to measurement coordinates (e.g., range, range rate and azimuth angle) for gating and scoring. Standard transformation equations are used for the direct path return, but a more complex set of transformation equations, based upon the relationships derived above (e.g., Equations 1-4 above) is used for multipath returns. The transformations from Cartesian to measurement coordinates for both direct path and multipath observations can be performed using the generally known standard linearization methods associated with the extended Kalman filter (EKF) or using unscented filtering. Finally, for those tracks that are updated with the observations, the update can be performed using the EKF or the unscented Kalman filter (UKF). In one embodiment, the EKF method has been used.

The relationships between the measured quantities (e.g., range, range rate, and azimuth angle) and the state estimates (derived above using Equations 1-4 above) are used to compute the expected measurement and the measurement matrix (H). The residual covariance matrix is then computed from $$S = HPH' + R$$

where P and R are Kalman and measurement error covariance matrices, respectively.

Given the H matrix, the Kalman gain is computed from $$K = PH'S^{-1}$$

where $S^{-1}$ is the inverse of S. The update will be performed, in effect, by using the measurement residuals directly to update the state in the TCF coordinate frame. There will be no need to transform the measurement to the TCF coordinate frame.

According to the above described embodiments of the present invention, the MHT algorithm has been extended to provide special tracking logic to consider multipath returns in updating the track of a same target by using a single sensor.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalent.

What is claimed is:

1. A method for tracking a target among a plurality of obstructions, by a radar using a multiple hypothesis tracking (MHT) algorithm, the method comprising:
    operating the radar to transmit a radar beam from a first location toward the target, wherein the radar beam is reflected from the target as a direct path return signal and reflected from the obstructions as a plurality of multipath return signals;
    operating the radar to receive a plurality of return signals that includes the direct path return signal and the plurality of multipath return signals at the first location from the target, and to generate a plurality of observations for a single radar dwell respectively corresponding to the plurality of return signals; and
    processing, by a processor, the plurality of observations in accordance with the MHT algorithm for at least two passes such that more than one of the plurality of observations are associated with a single track of the target to allow the track to be updated with both direct return signal and multipath return signals, wherein the at least two passes comprise a first pass and at least one second pass, and the processing the plurality of observations comprises:
    processing, by the processor, the plurality of observations in the first pass as if all of the observations to be associated with direct path return signals from the target; and
    processing, by the processor, the plurality of observations in the at least one second pass as if all of the observations to be associated with a single multipath return signal from the target.

2. The method of claim 1, wherein in the first pass, the processing the plurality of observations comprise initiating one or more potential first tracks in accordance with the plurality of observations, wherein each track of the one or more potential first tracks is associated with at most one of the plurality of observations.

3. The method of claim 2, wherein in the first pass, the processing the plurality of observations further comprises performing track filtering to update one or more potential existing tracks in accordance with the plurality of observations.

4. The method of claim 2, wherein a track of the one or more potential first tracks corresponding to a position outside of a preselected area where the target may be located is not updated in the at least one second pass.

5. The method of claim 1, wherein the processing the plurality of observations comprises propagating existing tracks to current time in the first pass.

6. The method of claim 1, wherein the processing the plurality of observations comprises one or more of converting observations, propagating existing tracks, initiating new tracks, and filtering tracks, only in the first pass.

7. The method of claim 1, wherein the at least one second pass comprises a plurality of second passes, and the plurality of observations are processed under a different preselected multipath scenario for each of the plurality of second passes.

8. The method of claim 1, wherein the processing the plurality of observations comprises one or more of gating, track scoring, track limiting, track coasting, branch track formation, and clusters merging, in each of the at least two passes.

9. The method of claim 1, wherein the processing the plurality of observations comprises one or more of maintaining track incompatibility list, limiting tracks in clusters, forming track hypotheses, identifying primary tracks, pruning tracks, updating universal tracks, and reclustering tracks, in a last one of the at least two passes.

10. A radar system comprising:
a transmitter configured to transmit a radar beam from a first location toward a target, wherein the radar beam is reflected from the target as a direct path return signal and reflected from the obstructions as a plurality of multipath return signals;
a receiver configured to receive a plurality of return signals at the first location from the target; and
a processor configured to generate a plurality of observations for a single radar dwell respectively corresponding to the plurality of return signals and to process the plurality of observations in accordance with a multiple hypothesis tracking (MHT) algorithm for at least two passes such that more than one of the plurality of observations are associated with a single track of the target to allow the track to be updated with both direct return signal and multipath return signals, wherein the at least two passes comprise a first pass and at least one second pass, and wherein the processor is configured to process the plurality of observations in the first pass as if all of the observations to be associated with direct path return signals from the target, and to process the plurality of observations in the at least one second pass as if all of the observations to be associated with a single multipath return signal from the target.

11. The radar system of claim 10,
wherein the processor is further configured to initiate one or more potential first tracks in accordance with the plurality of observations in the first pass, and
wherein each track of the one or more potential first tracks is associated with at most one of the plurality of observations.

12. The radar system of claim 11, wherein the processor is further configured to perform track filtering to update one or more potential existing tracks in accordance with the plurality of observations in the first pass.

13. The radar system of claim 11, wherein a track of the one or more potential first tracks corresponding to a position outside of a preselected area where the target may be located is not updated in the at least one second pass.

14. The radar system of claim 10, wherein the processor is further configured to propagate existing tracks to current time in the first pass.

15. The radar system of claim 10, wherein the processor is further configured to perform one or more of converting observations, propagating existing tracks, initiating new tracks, and filtering tracks, only in the first pass.

16. The radar system of claim 10, wherein the at least one second pass comprises a plurality of second passes, and the processor is configured to process the plurality of observations under a different preselected multipath in each of the plurality of second passes.

17. The radar system of claim 10, wherein the processor is further configured to perform one or more of gating, track scoring, track limiting, track coasting, branch track formation, and cluster merging, in each of the at least two passes.

18. The radar system of claim 10, wherein the processor is further configured to perform one or more of track incompatibility list maintenance, track cluster limiting, track hypotheses formation, primary tracks identification, tracks pruning, updating universal tracks, and track reclustering, in a last one of the at least two passes.

* * * * *